United States Patent
Chen et al.

(10) Patent No.: US 10,669,392 B2
(45) Date of Patent: Jun. 2, 2020

(54) METHOD OF PREPARING AEROGELS/NONWOVEN COMPOSITES FIREPROOF AND HEAT-INSULATING MATERIALS

(71) Applicant: Kun Shan University, Tainan (TW)

(72) Inventors: Jean-Hong Chen, Tainan (TW);
Shiu-Shiu Chen, Tainan (TW);
Chih-Shun Chang, Tainan (TW);
Chin-Chih Li, Tainan (TW)

(73) Assignee: KUN SHAN UNIVERSITY, Tainan (TW)

(*) Notice: Subject to any disclaimer, the term of this patent is extended or adjusted under 35 U.S.C. 154(b) by 200 days.

(21) Appl. No.: 15/873,712

(22) Filed: Jan. 17, 2018

(65) Prior Publication Data
US 2019/0055374 A1   Feb. 21, 2019

(30) Foreign Application Priority Data

Aug. 16, 2017   (TW) ............................. 106127828 A (51) Int. Cl.
*C08J 9/40*        (2006.01)
*C08G 77/38*    (2006.01)
(Continued)

(52) U.S. Cl.
CPC ............. *C08J 9/40* (2013.01); *B01J 13/0091* (2013.01); *B05D 1/02* (2013.01); *C08G 77/18* (2013.01);
(Continued)

(58) Field of Classification Search
CPC ........................................................ C08J 9/40
(Continued)

(56) References Cited

U.S. PATENT DOCUMENTS 8,021,583 B2   9/2011   Rouanet et al.
8,029,871 B2   10/2011   Nakayama et al.
(Continued)

FOREIGN PATENT DOCUMENTS

TW            I535658 B       6/2016

*Primary Examiner* — Tabatha L Penny
(74) *Attorney, Agent, or Firm* — Chun-Ming Shih (57) ABSTRACT

A method of preparing aerogels/nonwoven composites fireproof and heat-insulating materials with a hydrophobic or hydrophilic surfaces and includes steps as follows. A mixture solution in which alkoxysilane, silicones and silane coupling agents are mixed and stirred is instilled by acidic catalysts for a hydrolysis reaction during which a silane coupling agent solution is added for continuous stirring; a hydrous alkali catalytic (anhydrous alkali catalytic) organic solution is added in the mixture solution for a condensation reaction and development of a "silicones-silica aerogels-silane coupling agents" aerogel mixture solution; a nonwoven felt is impregnated with the mixture solution for development of soft hydrophobic (hydrophilic) aerogels/nonwoven composites fireproof and heat-insulating materials after curing and natural drying. The aerogels/nonwoven composites materials with softness and surface hydrophobicity/hydrophilicity available in mass production are applicable to thermal-insulating materials for high-temp industrial facilities or indoor heat-insulating and fireproof panels of a building structure.

9 Claims, 4 Drawing Sheets

(51) Int. Cl.

| | |
|---|---|
| C08J 9/28 | (2006.01) |
| C08J 9/228 | (2006.01) |
| B05D 1/02 | (2006.01) |
| D06M 23/00 | (2006.01) |
| D06M 15/643 | (2006.01) |
| D06M 11/79 | (2006.01) |
| D04H 13/00 | (2006.01) |
| B01J 13/00 | (2006.01) |
| C08K 5/5425 | (2006.01) |
| C08K 5/5415 | (2006.01) |
| D06M 13/507 | (2006.01) |
| C08G 77/18 | (2006.01) |
| D04H 1/587 | (2012.01) |
| C09D 183/06 | (2006.01) |
| D04H 1/64 | (2012.01) |
| D06M 13/513 | (2006.01) |
| C08G 101/00 | (2006.01) |

(52) U.S. Cl.
CPC .............. *C08G 77/38* (2013.01); *C08J 9/228* (2013.01); *C08J 9/28* (2013.01); *C08K 5/5415* (2013.01); *C08K 5/5425* (2013.01); *C09D 183/06* (2013.01); *D04H 1/587* (2013.01); *D04H 1/64* (2013.01); *D04H 13/00* (2013.01); *D06M 11/79* (2013.01); *D06M 13/507* (2013.01); *D06M 13/513* (2013.01); *D06M 15/643* (2013.01); *D06M 23/00* (2013.01); *C08G 2101/0091* (2013.01); *C08J 2201/0502* (2013.01); *C08J 2205/026* (2013.01); *C08J 2383/04* (2013.01); *D06M 2200/30* (2013.01); *D06M 2400/02* (2013.01); *D10B 2401/04* (2013.01); *D10B 2403/0242* (2013.01)

(58) Field of Classification Search
USPC ........................................................ 427/376.1
See application file for complete search history.

(56) References Cited

U.S. PATENT DOCUMENTS

| | | | |
|---|---|---|---|
| 8,734,931 B2* | 5/2014 | Seth | B32B 5/022 428/172 |
| 2014/0170350 A1* | 6/2014 | Sakamoto | B01J 37/036 428/36.5 |

* cited by examiner

METHOD OF PREPARING AEROGELS/NONWOVEN COMPOSITES FIREPROOF AND HEAT-INSULATING MATERIALS

BACKGROUND OF THE INVENTION

1. Field of the Invention

The present disclosure relates to a method of preparing aerogels/nonwoven composites fireproof and heat-insulating materials with softness and flexible surface hydrophilicity/hydrophobicity, particularly a "silica aerogel-silicone-silane coupling agent" aerogel solution system in which tetramethoxysilane (TMOS), tetraethoxysilane (TEOS), R(alkyl)-tetramethoxysilane (RTMS), or R(alkyl)-tetraethoxysilane (RTES), R(alkyl)-silicones and R(alkyl)-silane coupling agents are mixed; then, with a nonwoven composites felt impregnated with the "silica aerogel-silicone-silane coupling agent" aerogel mixture solution, the aerogel mixture solution and the non-woven fabrics are uniformly combined with each other and further dried after curing and natural drying for development of aerogels/nonwoven composites fireproof and heat-insulating materials with softness, flexible and surface hydrophobicity/hydrophilicity, which are applicable to thermal-insulating materials for high-temperature industrial facilities or indoor heat-insulating and fireproof panels of a building structure.

2. Description of the Prior Art

Aerogels are characteristic of some special properties such as low density, high porosity, high specific surface area and low heat conduction coefficient. As the method of preparing aerogels currently, the sol-gel method is based on steps of (1) mixing precursors such as alkoxysilane or tetramethoxysilane (TMOS) and hydrous organic solvents and (2) adding acidic catalysts for a hydrolysis reaction. Then, alkali catalysts are added into the hydrolysis reaction, which has been induced for a certain period, for a condensation reaction and generation of sols. With chemical bonding among molecules in sols in the condensation reaction kept ongoing, semi-solid polymer gels are created gradually and further cured after a period of time for development of a stable gel-based three-dimensional reticular structure.

Aerogels can be modified with chemical agents according to a mechanism as follows: —OH on the surface of aerogels reacts with —Cl on modifiers for production of hydrochloric acid; —H is replaced and modified as hydrophobic —OSi$(CH_3)_3$. The hydrophobic functional groups contribute to moderated surface tension in the process of drying aerogels at atmosphere pressure such that the three-dimensional structure of wet gels is maintained due to least volumetric contraction.

Traditional aerogel materials with plenty of water remained should be dried by a supercritical $CO_2$ dryer under conditions of temperature at 34 degree Celsius and high pressure for transformation of carbon dioxide from the liquid condition to the supercritical condition and drying of supercritical carbon dioxide from which water molecules are desorbed. However, the preparation of aerogels, usually cracked and broken, is unavailable in industrial applications due to the above process difficultly industrialized. In this regard, the preparation of aerogels deserves to be corrected.

The prior arts for aerogel materials disclosed as patents at home and abroad are listed as follows:

1. U.S. Pat. No. 8,029,871, "Method for producing silica aerogel coating", discloses a silica aerogel coating is produced by reacting a wet gel obtained by hydrolysis and polymerization of alkoxysilane with an organic-modifying agent to form organically modified silica, dispersing the organically modified silica by an ultrasonic treatment to form an organically modified silica dispersion, adding an ultraviolet-curable resin and a photo-polymerization initiator to the dispersion to prepare a silica aerogel coating liquid, applying the coating liquid to a substrate, and then irradiating ultraviolet rays to the coated layer.

2. U.S. Pat. No. 8,021,583, "Aerogel containing blanket", discloses a process of producing a blanket which involves forming an aqueous slurry of hydrophobic aerogels, fibers and at least one wetting agent, drying the aqueous slurry to form a substantially dried product, and calendaring the substantially dried product to form the blanket for a variety of applications.

3. Taiwan Patent 1353658, "Aerogels/nonwoven composites fireproof and heat-insulating materials and a method of preparing the same", discloses steps as follows: a mixture in which alkoxysilane or tetramethoxysilane (TMOS) and a low-hydrous organic solution are mixed is added by acidic catalysts for a hydrolysis reaction; an alkali catalytic anhydrous organic solution is added into the above mixture solution for development of gelatinized aerogels in a condensation reaction; the aerogels are added into and totally entangled with non-woven fabrics and dried for development of aerogels/nonwoven composites heat-insulating materials. As such, aerogels/nonwoven composites heat-insulating materials available in mass production are taken as thermal-insulating materials or fireproof panels.

SUMMARY OF THE INVENTION

The applicant, who researched previous patents for aerogels applicable to heat insulation or porous adsorbents, presents aerogels/nonwoven composites materials based on nonwoven composites fabrics and a "silicone-silica aerogel composite" aerogel mixture solution, both of which are impregnated with each other for preparation of a reticular structure with robustly entangled interfaces between aerogels and nonwoven composites materials, particularly aerogels/nonwoven composites materials featuring surface hydrophilicity/hydrophobic and softness and being available in mass production and taken as heat-insulating materials for high-temp. (or temperature) industrial facilities or household thermal-insulating materials such as fireproof panels. Thus, a method of preparing aerogels/nonwoven composites fireproof and heat-insulating materials based on nonwoven composites fabrics and an aerogel mixture solution is provided in the present disclosure. The method is aimed at producing soft and effectively fireproof and heat-insulating composite materials in which silicones, silica aerogels and nonwoven composites fabrics are combined with one another.

A method of preparing soft and fireproof aerogels/nonwoven composites materials by mixing aerogel solutions and nonwoven composites fabrics comprises steps as follows:

(S1) Mixture step: A mixture solution in which tetramethoxysilane (TMOS), tetraethoxysilane (TEOS), R(alkyl)-tetramethoxysilane (RTMS), R(alkyl)-tetraethoxysilane (RTES) or R(alkyl)-silicones, wherein R-(alkyl) is a functionally substituted alkyl or olefin segments with a reactive groups, R—, comprising acid (—COOH), amino (—NH2), imino (=NH), hydroxy (—OH), ether (—COC—), epoxy (—COH—COH), thiol (—SOOH), halide (—X), phosphate (—PO$_3$), sulfate (—SO$_4$) etc. function groups, the number of carbon atoms of the alkyl chain is from C1 to C13; and an organic mixture solution are mixed is stirred uniformly and speedily wherein the molar ratio (mol:mol) of alkoxysilane to silicones is kept at between 1.0:0 and 1.0:0.65.

Then, a small quantity of R(alkyl)-silane coupling agents are added into the mixture solution for continuous stirring and combination of the R(alkyl)-silane coupling agents and the aerogel structure wherein both the R(alkyl)-silicones and the silane coupling agents added in the silicones-aerogel structure are to moderate hydrophilicity of aerogels, strengthen chemical bonding between functional groups (R) and non-woven fabrics (PP, PET, glass fabric or rock wool) in the "silicones-silica aerogel-R(alkyl)-silane coupling agent" structure, and promote aggregation capability of silicones-aerogel molecules in a hydrous organic solution and stability of aerogels. In this regard, the molar ratio of alkoxysilane to silicones to silane coupling agents is kept at between 1.0:0.0001:0.0001 and 1.0:0.65:1.0.

The volume ratio of the "silicones-silica aerogels-silane coupling agents" mixture to the hydrous organic solution in the hydrolytic solution is kept at between 5:95 and 100:200. The molar content (mol %) of water in the hydrous organic solution of the hydrolytic solution is kept at between 0 and 80 mol %.

(S2) Hydrolysis step: A hydrolysis reaction is induced with hydrous acidic catalysts (acidic mixture with sulfuric acid (H$_2$SO$_4$), phosphoric acid (H$_3$PO$_4$), nitric acid (HNO$_3$) or hydrochloric acid (HCl)) or a single acid) instilled into the mixture solution. After the hydrolysis reaction, a transparent aerogel mixture solution in which silicones, silica aerogels and silane coupling agents are mixed is produced wherein the hydrolysis rate is faster when the content of acids added is higher.

(S3) Condensation step: An alkali catalytic hydrous organic solution prepared with alkali catalysts and a hydrous organic solution is gradually added into the hydrolyzed aerogel mixture solution for a condensation reaction through which a gelatinized "silicones-silica aerogels-silane coupling agents" aerogel solution system is produced.

(S30) Another condensation step: An alkali catalytic anhydrous organic solution prepared with alkali catalysts and an anhydrous organic solution is gradually added into the hydrolyzed aerogel mixture solution for a condensation reaction through which a gelatinized "silicones-silica aerogels-silane coupling agents" aerogel solution system is produced.

In the condensed solution, the molar content (mol %) of water in the hydrous organic solution is kept at between 0 and 80 mol %. Moreover, the molar ratio of alkali catalysts (an alkali solution with NaOH, NaHCO$_3$, Na$_2$CO$_3$ and NH$_4$OH mixed or an alkali solution with a single alkali) in the alkali catalytic organic solution to acidic catalysts in the aerogel solution in (2) is kept at between 1.02:1 and 3:1 wherein the aerogel solution is gelatinized faster when the molar ratio of alkali catalysts is higher.

(S4) Gelation step of aerogels/nonwoven composites materials (S4): A recycled nonwoven composites felt or an ordinary nonwoven composites felt is impregnated with a hydrous aerogel mixture solution based on the hydrous gelatinized "silicones-silica aerogels-silane coupling agents" such that the "silicones-silica aerogels-silane coupling agents" aerogel solution and the non-woven fabrics are completely combined with each other for further gelation of the "silicones-silica aerogels-silane coupling agents". The aerogel solution combined with nonwoven materials with a hydrophobicity surface of aerogel/nonwoven composites is prepared.

(S40) Another gelation step: A recycled nonwoven composites felt or an ordinary nonwoven composites felt is impregnated with an anhydrous aerogel mixture solution based on the anhydrous condensed "silicones-silica aerogels-silane coupling agents" such that the "silicones-silica aerogels-silane coupling agents" anhydrous aerogel solution and the non-woven fabrics are completely combined with each other for further gelation of the "silicones-silica aerogels-silane coupling agents" anhydrous aerogel solution during which the "silicones-silica aerogels-silane coupling agents" anhydrous aerogels are entangled with the nonwoven composites fabrics. The anhydrous aerogel solution combined with nonwoven materials with a hydrophilicity surface of aerogel/nonwoven composites is prepared.

(S5, S50) Natural drying step at atmosphere pressure for development of soft, porous and hydrophobic aerogels/nonwoven composites materials (S5) and soft, porous and hydrophilic aerogels/nonwoven composites materials (S50): Alcohols in the aerogels/nonwoven composites materials are quickly desorbed at temperature ca. 80 degrees Celsius; then, the aerogels/nonwoven composites materials at higher temperatures between 105 and 120 degrees Celsius are dehydrated and dried. As such, soft and porous aerogels/nonwoven composites materials are produced.

In a method of preparing aerogels/nonwoven composites fireproof and heat-insulating materials, the silicone rubber (poly(dimethylsiloxane); PDMS or MDMS) contains either bi-functional groups at paired ends or tri-/quadri-functional groups with side chains at paired ends structurally wherein the functional group of the silicone rubber (PDMS or MDMS) might be acidyl (—COOH), amino (—NH2), hydroxyl (—OH), carboxyl, epoxy or ether.

Furthermore, the acidic catalysts can be an acidic mixture such as H$_2$SO$_4$+H$_3$PO$_4$ and HNO$_3$+HCl or a single acid and the first hydrous organic solution is selected from either water, C1-C5 alcohols, C1-C5 acids, C1-C5 esters, or C1-C5 ethers or a combination thereof wherein the molar ratio of alkoxysilane to silicones to silane coupling agents is kept at between 100:0.01:0.01 and 100:65:100. Moreover, the volume percentage (V/V %) of the "silicones-silica aerogels-silane coupling agents" aerogel solids to the whole hydrous organic aerogel solution is kept at between 5.0% and 95.0%. In addition, the more the hydrous organic solutions are added, the more the pores are generated in dried aerogels. In this regard, voids among hydrous organic solvents are connected to one another gradually when the content of the hydrous organic solution is more than 50.0%.

Furthermore, the mole percentage (mol %) of acidic catalysts in the solution in (S2) is kept at between 0.001% and 0.1%. When the mole percentage of acidic catalysts is increased, chemical bonding among alkoxysilane, silicones and silane coupling agents is strengthened for copolymerization.

Furthermore, the alkali catalyst in the solution in (S3) can be either an alkali mixture solution with NaOH, NaHCO$_3$, Na$_2$CO$_3$ and NH$_4$OH or a single alkali solution and the second hydrous organic solution is selected from either water, C1-C5 alcohols, C1-C5 ammonia, C1-C5 esters, or C1-C5 ethers or a combination thereof.

Furthermore, the molar ratio of alkali catalysts in the catalytic organic solution to acidic catalysts in the aerogel solution is kept at between 1.02:1 and 3.0:1 wherein the higher molar ratio of alkali catalysts contributes to the faster condensation reaction of the "silicones-silica aerogels-silane coupling agents" aerogel solution, for example, the condensation reaction of the "silicones-silica aerogels-silane coupling agents" aerogel solution is reduced to 3 to 5 minutes from 1,100 minutes.

Furthermore, a recycled nonwoven composites felt or an ordinary nonwoven composites felt is impregnated with the non-gelationed "silicones-silica aerogels-silane coupling agents" aerogel mixture solution in the gelation step (S4; S40) such that non-woven fabrics are totally immersed in the "silicones-silica aerogels-silane coupling agents" aerogel solution for gelation of the solution during which the "silicones-silica aerogels-silane coupling agents" aerogels and the non-woven fabrics are entangled with each other and further dried in a natural drying step for preparation of soft porous aerogels/nonwoven composites materials.

Furthermore, the structure in which the "silicones-silica aerogels-silane coupling agents" aerogel mixture solution and the non-woven fabrics are combined with each other is constructed in the gelation step (S4; S40) through Rolling-to-Rolling continuous process with using spray coating, sprinkling, impregnation processing or continuous pressure suction and continuous padding of aerogel mixture solutions.

The time of the drying step at temperatures from 30 to 120 degrees Celsius and atmosphere pressure is reduced to 150 minutes from 360 minutes because higher temperature contributes to less time spent in drying.

Furthermore, the volume percentage (V/V %) of the "silicones-silica aerogels-silane coupling agents" aerogels to non-woven fabrics in the aerogels/nonwoven composites heat-insulating materials is kept at between 15 and 70%.

Furthermore, the nonwoven composites felt is made of either polyethylene (PE), polyethylene terephthalate (PET), polyamide (Nylon), glass fiber, rock wool or carbon fiber fabrics or blanket or a combination thereof.

The aerogels/nonwoven composites materials provided in the present disclosure are prepared with processing techniques such as continuous sprinkling, continuous pressure suction, continuous mist spraying, continuous padding and impregnation for the "silicones-silica aerogels-silane coupling agents" aerogel solution and the nonwoven composites fabrics. In this regard, the aerogels/nonwoven composites materials comprise nonwoven composites fabrics and aerogel mixtures in which silicones, silica aerogels and silane coupling agents are mixed and both the aerogel mixtures and the non-woven fabrics are entangled with each other for development of a three-dimensional reticular structure.

Furthermore, the silane coupling agent is a silane structure including alkenes or long-chain alkenes and further reactive groups which may comprise coupling agents such as chlorinated silane coupling agent, alkenyl silane coupling agent, epoxy silane coupling agent, acidyl silane coupling agent, amino silane coupling agent, hydroxyl silane coupling agent or carboxyl silane coupling agent.

A method of preparing aerogels/nonwoven composites fireproof and heat-insulating materials is effective in:

1. The fireproof and heat-insulating aerogels/nonwoven composites materials, which are prepared with soft porous "silicones-silica aerogels-silane coupling agents" aerogels combined, are characteristic of flexible surface hydrophilicity/hydrophobicity and the mechanical property of non-woven fabrics such as softness and available in mass production at room temperature and atmosphere pressure. The aerogels/nonwoven composites materials are applicable to various conditions, for example, fire protection, heat-insulating building materials, fireproof/thermal-insulating materials for high-temp industrial facilities, acoustic/thermal insulation for cars and general purposes, etc.

2. For better cohesion between aerogels and non-woven fabrics and no powder dropped, the properties of the "silica gel-silica aerogel-silane coupling agent" aerogels such as hydrophilicity, hydrophobicity and bonding force between aerogels and nonwoven composites fabrics can be modified according to the content of a specific ingredient in the "silicones-silica aerogels-silane coupling agents" aerogels.

3. The time spent in co-hydrolysis of the "silicones-silica aerogels-silane coupling agents" is controllable by adjusting the concentration of acidic catalysts. When the concentration of acidic catalysts is 0.001M, the hydrolysis reaction is completed in four hours; when the concentration of acidic catalysts is 0.1M, the time for hydrolysis is reduced to 20 minutes.

4. The time for production of aerogels in a condensation reaction is adjustable according to the content of alkali catalysts in the alkali catalytic organic solution. When the molar ratio of alkali catalysts to acidic catalysts is 1.02:1, gelatinization is completed in 16 hours; when the molar ratio of alkali catalysts to acidic catalysts is 3.0:1, the time for gelatinization is reduced to 5-15 minutes. As such, the micro-phase separation and the microstructure of aerogels in the "silicones-silica aerogels-silane coupling agents" aerogel solution are controllable for regulated process time of aerogels/nonwoven composites materials.

5. The "silicones-silica aerogels-silane coupling agents" aerogel mixture solution prepared in hydrolysis is based on the ratio of hydrophilic to hydrophobic groups in chemical functional groups of "silica gel-silane coupling agent" molecules during a chemical bonding process of silicones, silica aerogels and silane coupling agents for moderate retractions of water molecules which result in burst or contraction. Thus, the "silicones-silica aerogels-silane coupling agents" aerogels are dried at room temperature and atmosphere pressure and the contractibility of the "silicones-silica aerogels-silane coupling agents" aerogels in a drying step is restrained. As such, the performance of non-woven fabrics in heat insulation or heat resistance is strengthened by correction in fragility of pure aerogels in a conventional aerogel system which usually contract, fracture or collapse in virtue of the surface tension of water molecules during evaporation.

6. In the condensation step of the present disclosure, a hydrous (anhydrous) alkali catalytic organic solution prepared with alkali catalysts and a hydrous (anhydrous) organic solution is used to prepare "silicones-silica aerogels-silane coupling agents" aerogel system with a hydrophobic (hydrophilic) surface in the condensation reaction.

7. In the gelatinization step of the present disclosure, a nonwoven composites felt is impregnated with a surface hydrophobic (hydrophilic) "silicones-silica aerogels-silane coupling agents" aerogel solution such that the "silicones-silica aerogels-silane coupling agents" aerogel solution is appropriately combined with non-woven fabrics for preparation of porous aerogels/nonwoven composites materials with flexible surface hydrophobicity (hydrophilicity).

8. The nonwoven composites fabrics in the present disclosure are made of either polyethylene (PE), polypropylene (PP), poly-propyl-ethylene (PPE), polyester, polyamide, glass fiber or rock wool or a combination thereof. With the "silicones-silica aerogels-silane coupling agents" aerogel solution gelatinized, a three-dimensional reticular structure in which the "silicones-silica aerogels-silane coupling agents" aerogels are robustly entangled with and difficultly separated from non-woven fabrics is constructed.

9. The unmodified hydrophilic aerogels/nonwoven composites materials in the present disclosure are dried at room temperature and atmosphere pressure; then, the "silicones-silica aerogels-silane coupling agents" aerogels at higher temperatures from 105 to 120 degrees Celsius are quickly dehydrated.

BRIEF DESCRIPTION OF THE DRAWINGS

The technical content, purposes and effects of a method of preparing aerogels/nonwoven composites fireproof and heat-insulating materials in the present disclosure are further explained in the preferred embodiment and accompanying drawings which are shown as follows:

FIG. 3(*a*) is a photo showing prepared surface-hydrophobic aerogel/nonwoven composite materials;

FIG. 3(*b*) is a photo showing prepared surface-hydrophilic aerogel/nonwoven composite materials;

FIG. 4(*a*) is a SEM (scanning electron microscope) photo showing the surface of "silicones-silica aerogels-silane coupling agents" aerogels/nonwoven composite fireproof and head-insulating materials;

FIG. 4(*b*) is a SEM (scanning electron microscope) photo showing the cross section of "silicones-silica aerogels-silane coupling agents" aerogels/nonwoven composite fireproof and head-insulating materials;

FIG. 4(*c*) is a SEM (scanning electron microscope) photo showing an enlarged cross section of "silicones-silica aerogels-silane coupling agents" aerogels/nonwoven composite fireproof and head-insulating materials; and FIG. 4(*d*) is a SEM (scanning electron microscope) photo showing another enlarged cross section of "silicones-silica aerogels-silane coupling agents" aerogels/nonwoven composite fireproof and head-insulating materials.

DETAILED DESCRIPTION OF THE PREFERRED EMBODIMENT

The purposes, characteristics and advantages of a method of preparing aerogels/nonwoven composites fireproof and heat-insulating materials in the present disclosure are clearly explained in the preferred embodiment and accompanying drawings as follows.

Figure 1:
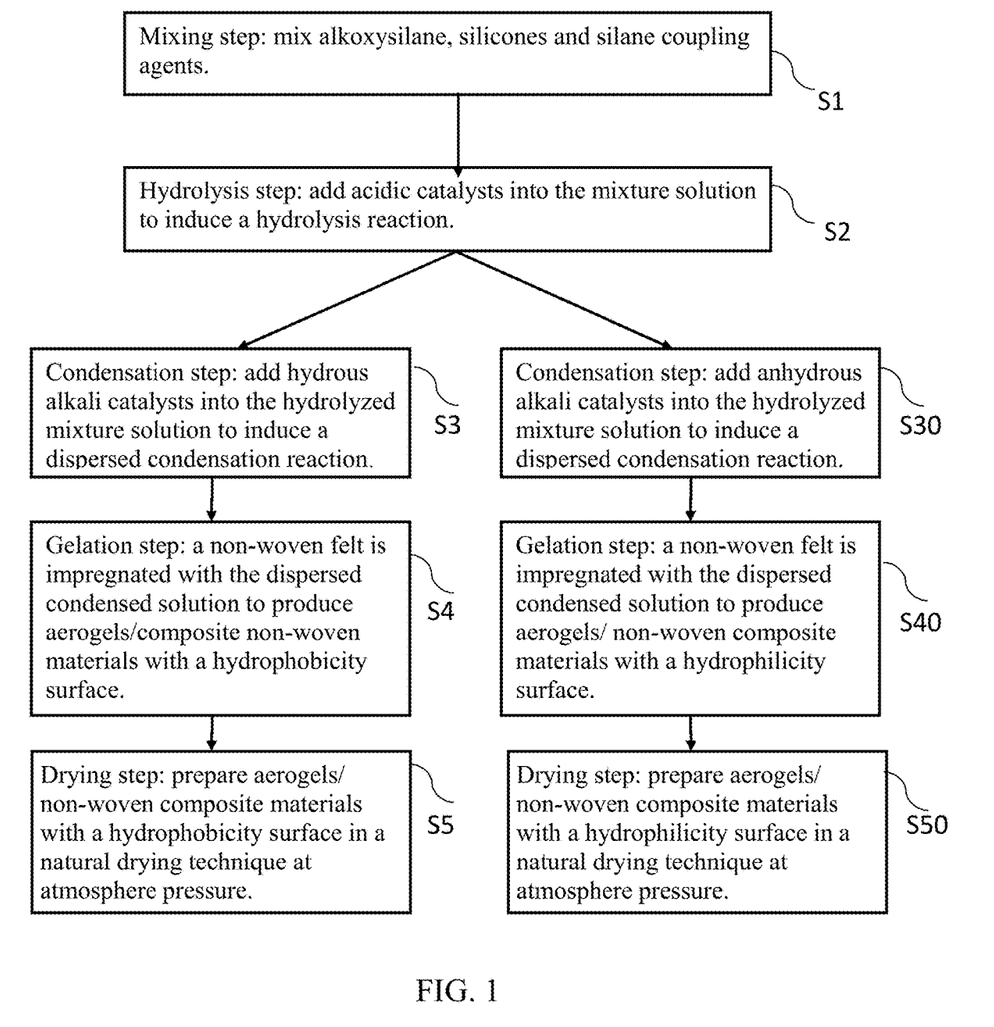
FIG. 1 is a flow chart for a method of preparing aerogels/nonwoven composites fireproof and heat-insulating materials.

Referring to FIG. 1, which is a flow diagram for a method of preparing aerogels/nonwoven composites fireproof and heat-insulating materials. A method of preparing hydrophilic and hydrophobic aerogels/nonwoven composites fireproof and heat-insulating materials provided in the present disclosure comprises steps as follows. (1) Mixture step (S1): Alkoxysilane (tetraethoxysilane (TEOS)) and silicones (polydimethenesilicones-silica aerogels-silane coupling agents (PDMS)) are selected as two chemical compounds used in the embodiment. A mixture solution in which tetramethoxysilane (TMOS), tetraethoxysilane (TEOS), R(alkyl)-tetramethoxysilane (RTMS), or R(alkyl)-tetraethoxysilane (RTES), R(alkyl)-silicones wherein R-(alkyl) is a functionally substituted alkyl or olefin segments with a reaction group, R—, comprising acid (—COOH), amino (—NH2), imino (=NH), hydroxy (—OH), ether (—COC—), epoxy (—COH—COH), thiol (—SOOH), halide (—X), phosphate (—PO$_3$), sulfate (—SO$_4$) etc. function groups, the number of carbon atoms of the alkyl chain is from C1 to C13; and an organic mixture solution are mixed is stirred uniformly and speedily wherein the molar ratio (mol:mol) of alkoxysilane to silicones is 1:0.005 and 1:0.02.

Figure 2:
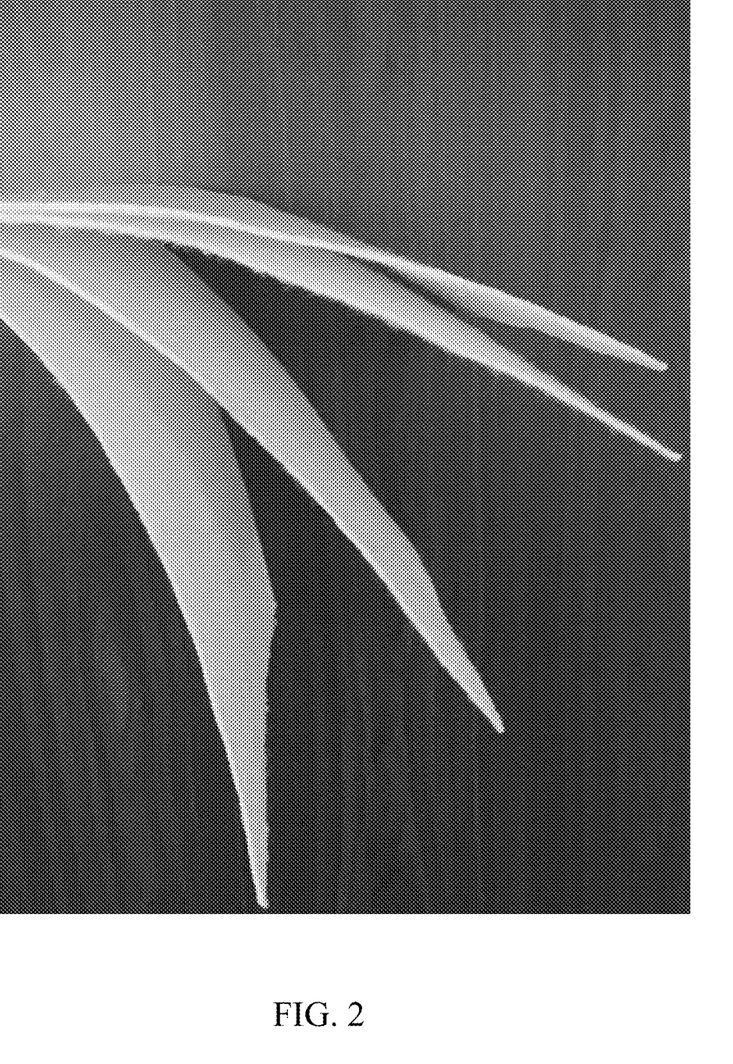
FIG. 2 is a photo illustrating different softness degrees of aerogels/nonwoven composites fireproof and heat-insulating materials prepared in various recipes.

Then, a small quantity of R(alkyl)-silane coupling agents are added into the mixture solution for continuous stirring and combination of the R(alkyl)-silane coupling agents and the aerogel structure wherein both the R(alkyl)-silicones and the silane coupling agents added in the silica gel-aerogel structure are to moderate hydrophilicity of aerogels, strengthen chemical bonding between functional groups (R) and non-woven fabrics (PP, PET, glass fabric or rock wool) in the "silicone-silica aerogel-R(alkyl)-silane coupling agent" structure, and promote aggregation capability of silicone-aerogel molecules in a hydrous organic solution and stability as well as softness of aerogels. Referring to FIG. 2, which is a photo illustrating different softness degrees (1:0.005 and 1:0.01 and 1:0.02) of aerogels/nonwoven composites fireproof and heat-insulating materials prepared in various recipes.

In this regard, the molar ratio (mol:mol:mol) of alkoxysilane to silicones to silane coupling agents is 100:0.5:0.1. The volume ratio of the "silicones-silica aerogels-silane coupling agents" mixture to the hydrous organic solution in the hydrolytic solution is 5:95. The molar content (mol %) of water in the hydrous organic solution of the hydrolytic solution is 50 mol %.

(2) Hydrolysis step (S2): A hydrolysis reaction is induced with hydrous acidic catalysts ($H_2SO_4$ solution, 0.001 mol %) instilled into the mixture solution. After the hydrolysis reaction, a transparent aerogel mixture solution in which silicones, silica aerogels and silane coupling agents are mixed is produced.

(3) Condensation step (S3): An alkali catalytic hydrous organic solution prepared with alkali catalysts (NaOH solution, 0.0015 mol %) and a hydrous organic solution is gradually added into the "silicones-silica aerogels-silane coupling agents" mixture solution for a condensation reaction through which a gelatinized "silicones-silica aerogels-silane coupling agents" aerogel solution is produced wherein the molar ratio of alkali catalysts (NaOH solution) in the alkali catalytic hydrous organic solution to acidic catalysts ($H_2SO_4$) in the aerogel solution in (2) is 1.5:1. A local three-dimensional structure with "silicones-silica aerogels-silane coupling agents" molecules combined can be produced in a condensation reaction in which silicones, silica aerogels and silane coupling agents are catalyzed by added alkali catalysts.

(S30) Another condensation step: An alkali catalytic anhydrous organic solution prepared with alkali catalysts and an anhydrous organic solution is gradually added into the aerogel mixture solution for a condensation reaction through which a gelatinized "silicones-silica aerogels-silane coupling agents" aerogel solution system is produced wherein the molar content (mol %) of water in the hydrous organic solution of the gelatinized solution is kept at between 0 and 50 mol %. Moreover, the molar ratio of alkali catalysts (an alkali solution with NaOH, $NaHCO_3$, $Na_2CO_3$ and $NH_4OH$ mixed or an alkali solution with a single alkali) in the alkali catalytic organic solution to acidic catalysts in the aerogel solution in (2) is kept at between 1.02:1 and 3:1 wherein the aerogel solution is gelatinized faster when the molar ratio of alkali is higher.

(4) Gelation step of aerogels/nonwoven composites materials (S4): A nonwoven composites felt (70% E-glass fiber wool with 30% PP fibers mixed) is impregnated with the non-gelatinized "silicones-silica aerogels-silane coupling agents" aerogel mixture solution such that nonwoven composites fabrics are totally immersed in the "silicones-silica aerogels-silane coupling agents" aerogel solution for gelatinization and curing of the solution during which the "silicones-silica aerogels-silane coupling agents" aerogels are entangled with the nonwoven composites fabrics for preparation of aerogels combined with nonwoven composites materials with a hydrophobicity surface.

(S40) Another gelatinization step: A recycled nonwoven composites felt or an ordinary nonwoven composites felt is impregnated with an "anhydrous gelatinized silicones-silica aerogels-silane coupling agents" hydrous aerogel mixture solution such that the "silicones-silica aerogels-silane coupling agents" aerogel solution and the non-woven fabrics are completely combined with each other for gelatinization of the "silicones-silica aerogels-silane coupling agents" aerogel solution during which the "silicones-silica aerogels-silane coupling agents" aerogels are entangled with the nonwoven composites fabrics for preparation of aerogels combined with nonwoven composites materials with a hydrophilicity surface.

(5) Natural drying step at room temperature and atmosphere pressure (S5): The wet aerogels/nonwoven composites materials are dried in a fast evaporation & drying process at temperatures between 30 and 80 degrees Celsius at which the hydrous organic solution in aerogels is boiled and evaporated; then, the aerogels/nonwoven composites materials at higher temperatures from 105 to 120 degrees Celsius are quickly dehydrated and dried for development of a three-dimensional reticular structure, that is, porous aerogels/nonwoven composites materials in which the dried aerogels and the non-woven fabrics are entangled with each other. As such, soft, porous and hydrophobic aerogels/nonwoven composites materials (S5) (soft, porous and hydrophilic aerogels/nonwoven composites materials (S50)) are prepared.

The silane coupling agent is classified as silane including alkenes/olefins or long-chain alkenes/olefins structurally and further reactive groups which may comprise coupling agents such as chlorinated silane coupling agent, alkenyl silane coupling agent, epoxy silane coupling agent, acidyl silane coupling agent, amino silane coupling agent, hydroxyl silane coupling agent or carboxylic silane coupling agent.

Preferably, the acidic catalyst can be either an acidic mixture with sulfuric acid ($H_2SO_4$), phosphoric acid ($H_3PO_4$), nitric acid ($HNO_3$), or hydrochloric acid (HCl) or a single acid and the first hydrous organic solution is selected from either water, C1-C5 alcohols, C1-C5 acids, C1-C5 esters, or C1-C5 ethers or a combination thereof wherein the molar ratio of alkoxysilane to silicones to silane coupling agents is 1:0.05:0.01 and the volume percentage (V/V %) of the "silicones-silica aerogels-silane coupling agents" aerogel solids to the whole hydrous organic aerogel solution is 8.0%.

Figure 3A:
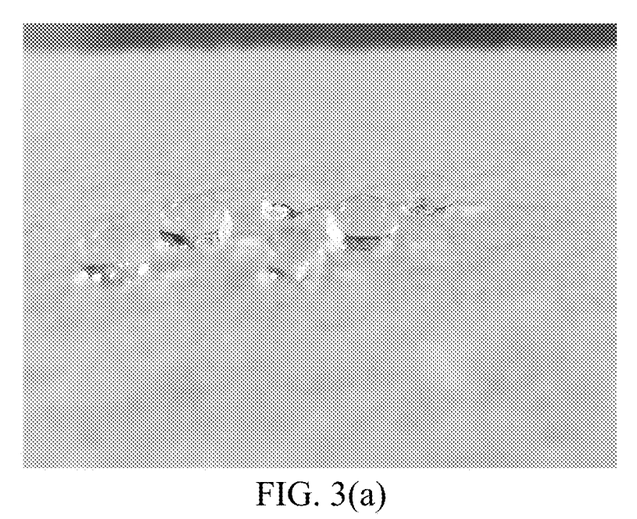
Figure 3B:
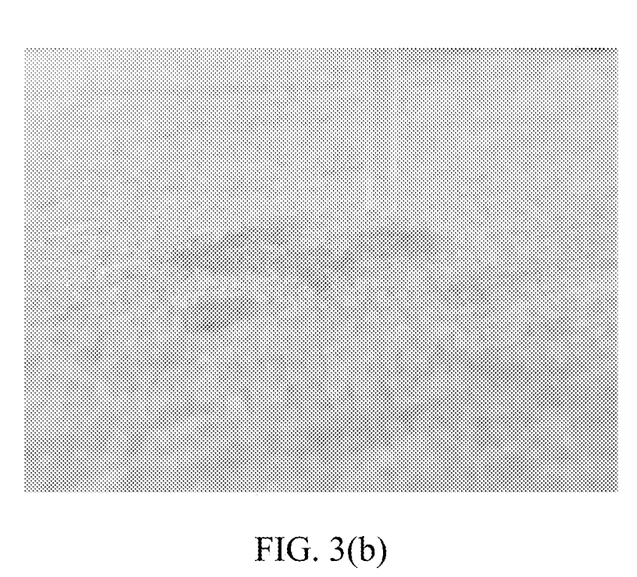

FIGS. 3(a) and 3(b) are photos for surface hydrophilicity of aerogels/nonwoven composites fabrics attributed to the content of the water in the hydrous organic solution which inside the aerogel solution system. When the content of the water in hydrous organic solution inside the whole aerogel solution system prepared accounts for over 10.0 mol %, hydrophobic functional groups in the "silicones-silica aerogels-silane coupling agents" aerogel system (for example, molecular chains of silicones and hydrophobic functional groups of silane coupling agents) under actions of hydrophilic functional groups among hydrous organic solvents are repelled and drawn out of the periphery of the whole aerogel structure for combination of the "silicones-silica aerogels-silane coupling agents" aerogels with surface hydrophobicity and nonwoven composites fabric materials (FIG. 3(a)).

When the content of the water in hydrous organic solution inside the whole aerogel solution system prepared accounts for less than 10.0 mol %, aerogels/nonwoven composites fabric materials with surface hydrophilicity are prepared (FIG. 3(b)) and nanometer pores in the aerogel system are gradually connected to one another for development of contiguous mesoporous structures or micro-voids. In the preferred embodiment of the present disclosure, the molar ratio of alkoxysilane to silicones to silane coupling agents is 1.0:0.005:0.001 The volume ratio of the "silicones-silica aerogels-silane coupling agents" mixture to the hydrous organic solution in the hydrolytic solution is 20:80. The molar content (mol %) of water in the hydrous organic solution of the hydrolytic solution is 50 mol %.

Figure 4A:
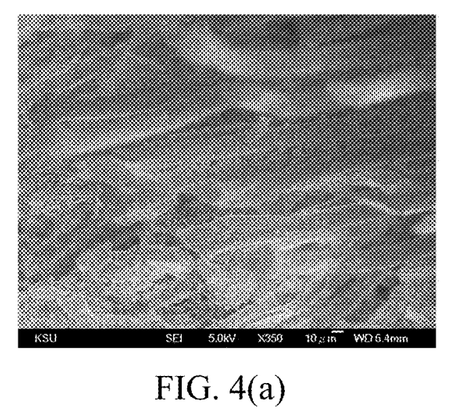
Figure 4B:
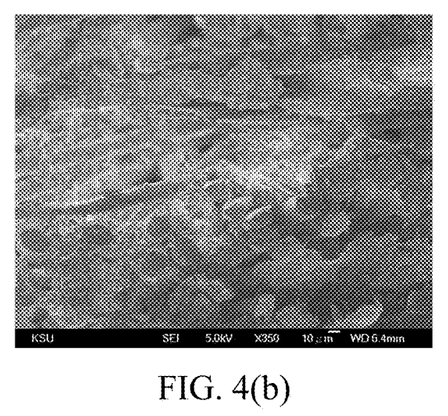
Figure 4C:
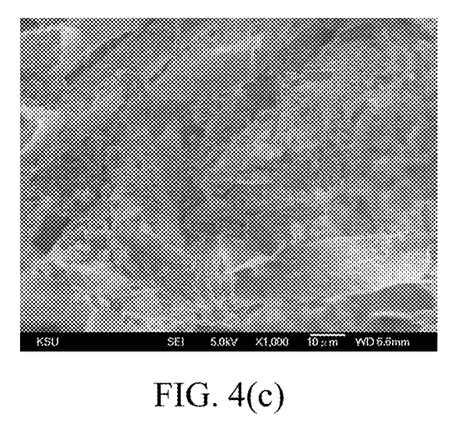
Figure 4D:
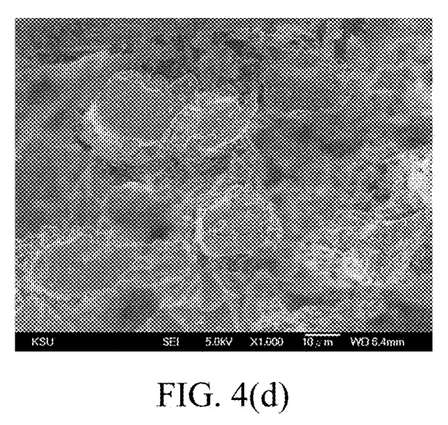

In the present disclosure, the aerogels are prepared with an improved sol-gel method based on a conventional one and characteristic of chemical bonding that is implemented among silica gel molecules, silica aerogel molecules and silane coupling agents in the acidic condition without drawbacks of the conventional sol-gel method. FIGS. 4(a) and 4(b) are SEM (scanning electron microscope) photos for the surface and the cross section of "silicones-silica aerogels-silane coupling agents" aerogels/nonwoven composites fireproof and heat-insulating materials, respectively; FIGS. 4(c) and 4(d) are photos for enlarged cross sections of "silicones-silica aerogels-silane coupling agents" aerogels/nonwoven composites fireproof and heat-insulating materials from which the "silicones-silica aerogels-silane coupling agents" aerogels are filled in voids among non-woven fabrics certifiably for development of a porous reticular structure. Moreover, the good surface binding between "silicones-silica aerogels-silane coupling agents" aerogels and non-woven fabrics contributes to a three-dimensional reticular structure in which non-woven fabrics and aerogels are entangled with each other and service life as well as physical properties of "silicones-silica aerogels-silane coupling agents" aerogels combined with hydrophobic non-woven fabrics.

Preferably, the alkali catalyst can be either an alkali mixture with ammonium hydroxide ($NH_4OH$), sodium hydroxide (NaOH), potassium hydroxide (KOH), calcium hydroxide ($Ca(OH)_2$), sodium carbonate ($Na_2COOH$), sodium bicarbonate (NaHCOOH) and calcium carbonate (CaCOOH) or a single alkali and the second hydrous organic solution is selected from either water, de-ionized water, C1-C5 alcohols, C1-C5 ammonia, C1-C5 polyalcohols, or C1-C5 ketones or a combination thereof. In the preferred embodiment of the present disclosure, the second hydrous organic solution is illustrated with water and alcohol solvent. Depending on hydrophilicity/hydrophobicity of non-woven fabrics, alcohol, ammonia, polyalcohol and ketone, which are mutually soluble, can be flexibly mixed pro rata.

Preferably, the hydrolysis reaction is done in 10 to 60 minutes which is shortened with the molar content of the acidic catalysts increased: when the molar ratio of alkali catalysts to acidic catalysts is 1:1, the time spent in gelatinization is about 1,100 minutes; when the molar ratio of alkali catalysts to acidic catalysts is 3:1, the time spent in gelatinization is reduced to 3 minutes or so for controllable impregnation of non-woven fabrics. In addition, the time spent in condensation is shortened when the molar ratio of alkali catalysts is increased.

Preferably, the volume percentage of aerogels in the aerogels/nonwoven composites fireproof and heat-insulating materials is kept at between 20 and 75%. For less consumptions of aerogels and controllable manufacturing costs, the aerogels/nonwoven composites fireproof and heat-insulating materials in which the volume percentage of aerogels is lower than 35%, are taken as ordinary heat-insulating materials. On the other hand, the aerogels/nonwoven composites fireproof and heat-insulating materials in which the volume percentage of aerogels is higher than 35%, are taken as building materials due to their good heat-insulating and fireproof performance.

Preferably, the drying step should be a natural drying process at room temperature or a fast drying process at 30 to 80 degrees Celsius over 360 to 120 minutes for a better yield rate in contrast to a conventional process for gasification of hydrous organic solvents at higher temperature which makes aerogels fractured or collapsed.

Preferably, the nonwoven composites felt is made of either polyethylene (PE), polypropylene (PP), poly-propylethylene (PPE), polyethylene terephthalate (PET), polyamide (nylon), glass fiber, rock wool or carbon fiber cotton or a combination thereof and the specific nonwoven composites fabrics are robustly entangled with but difficultly separated from the composite aerogels based on ratios of silicones to silica aerogels to silane coupling agents in the aerogel system.

The above descriptions explain the preferred embodiment in the present disclosure; however, the embodiment is not intended to limit the scope of the patent application. Any equivalent modification or change without departing from the spirit of the patent specification or claims should be incorporated in the claims thereinafter.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method of preparing a fireproof and heat-insulating material with a hydrophobic or hydrophilic surface, comprising steps of:
    a mixture step: wherein a mixture solution in which alkoxysilane, silicones and silane coupling agents are mixed is stirred, and the molar ratio of alkoxysilane to silicones to silane coupling agents is kept at between 1.0:0.0001:0.0001 and 1.0:0.65:1.0;
    a hydrolysis step: wherein hydrous acidic catalysts are instilled into the mixture solution in the mixture step, for inducing a hydrolysis reaction during which a silane coupling agent solution is added and continuously stirred for production of a silicones-silica aerogels-silane coupling agents aerogel mixture solution, and the acidic catalyst is selected from sulfuric acid, phosphoric acid, nitric acid, hydrochloric acid or a combination thereof;
    a condensation step: wherein an alkali catalytic hydrous organic solution prepared with alkali catalysts and a hydrous organic solution is gradually added into the silicones-silica aerogels-silane coupling agents aerogel mixture solution for a condensation reaction through which a non-gelatinized silicones-silica aerogels-silane coupling agents aerogel solution is produced, and the alkali catalyst is selected from NaOH, NaHCO3, Na2CO3 or NH4OH or a combination thereof; and
    a gelation step: wherein a nonwoven composites felt is impregnated with the non-gelatinized silicones-silica aerogels-silane coupling agents aerogel solution such that the non-gelatinized silicones-silica aerogels-silane coupling agents aerogel solution is gelatinized, and the gelatinized silicones-silica aerogels-silane coupling agents aerogel solution and the nonwoven composites felt are completely combined with each other and further dried for development of the fireproof and heat-insulating material, the fireproof and heat-insulating material comprising an aerogel and the nonwoven composites felt.

2. A method of preparing a fireproof and heat-insulating material with a hydrophobic or hydrophilic surface as claimed in claim 1, wherein the molar ratio of alkoxysilane to silicones in the mixture step is kept at between 1.0:0.001 and 1.0:0.65, the silicones contain bi-functional groups at paired ends, and the functional group of the silicones are selected from acidyl (—COOH), amino (—NH2), hydroxyl (—OH), carboxyl, epoxy or a combination thereof.

3. A method of preparing a fireproof and heat-insulating material with a hydrophobic or hydrophilic surface as claimed in claim 1, wherein the molar ratio of alkoxysilane to silicones to silane coupling agents in the mixture step is kept at between 1.0:0.01:0.001 and 1.0:0.65:1.0, the volume ratio of the mixture solution to the hydrous acidic catalysts in the hydrolysis step is kept at between 5:95 and 100:200, and the silane coupling agent is selected from chlorinated silane coupling agent, alkenyl silane coupling agent, epoxy silane coupling agent, acidyl silane coupling agent, amino silane coupling agent, hydroxyl silane coupling agent or carboxyl silane coupling agent.

4. A method of preparing a fireproof and heat-insulating material with a hydrophobic or hydrophilic surface as claimed in claim 1, wherein the molar ratio of alkali catalysts to acidic catalysts is kept at between 1.02:1 and 3:1 and the non-gelatinized silicones-silica aerogels-silane coupling agents aerogel solution is gelatinized faster when the molar ratio of alkali catalysts is higher.

5. A method of preparing a fireproof and heat-insulating material with a hydrophobic or hydrophilic surface as claimed in claim 1, wherein the impregnation in the gelation step is completed by spray coating, sprinkling, impregnation processing or continuous padding of solutions.

6. A method of preparing a fireproof and heat-insulating material with a hydrophobic or hydrophilic surface as claimed in claim 1, wherein the molar content of water in the alkali catalytic hydrous organic solution in the condensation step is kept at from 0 to 80 mol % and for preparation of a fireproof and heat-insulating materials with surface hydrophilicity, the molar content of water is less than 10 mol %; or for preparation of a fireproof and heat-insulating material with surface hydrophobicity, the molar content of water is greater than 10 mol %.

7. A method of preparing a fireproof and heat-insulating material with a hydrophobic or hydrophilic surface as claimed in claim 1, wherein molar content of water in the alkali catalytic hydrous organic solution in the condensation step is kept at from 0 to 80 mol %.

8. A method of preparing a fireproof and heat-insulating material with a hydrophobic or hydrophilic surface as claimed in claim 1, wherein the volume percentage of the aerogel in the fireproof and heat-insulating material is kept at between 5% and 80%.

9. A method of preparing a fireproof and heat-insulating material with a hydrophobic or hydrophilic surface as claimed in claim 1, wherein the drying in the gelation step is performed by dehydration at room temperature and atmosphere pressure or by evaporation at temperatures between 30 and 180 degrees Celsius and the nonwoven composites felt is made of polyethylene (PE), polypropylene (PP), poly-propyl-ethylene (PPE), polyethylene terephthalate (PET), polyamide (Nylon), polyester, glass fiber, rock wool or a combination thereof.

* * * * *